Oct. 15, 1968       J. S. BALLARD ETAL       3,405,600
              NUMERICAL CONTROL POSITIONING APPARATUS
Filed Feb. 9, 1966                              3 Sheets-Sheet 2

*Fig. 2.*

INVENTORS
John S. Ballard
Kenneth D. Garnjost
Robert Z. Hague
William C. Moog
Conrad C. Treff BY
*Popp and Sommer*
ATTORNEYS Oct. 15, 1968   J. S. BALLARD ET AL   3,405,600
NUMERICAL CONTROL POSITIONING APPARATUS
Filed Feb. 9, 1966   3 Sheets-Sheet 3
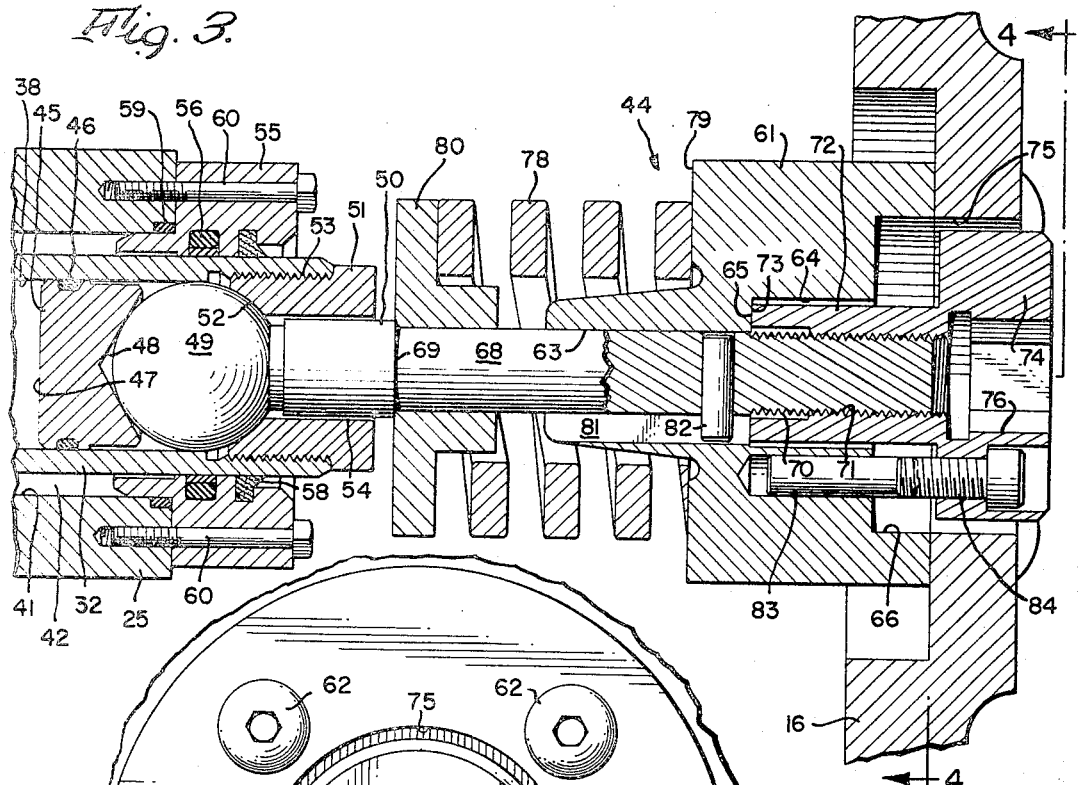
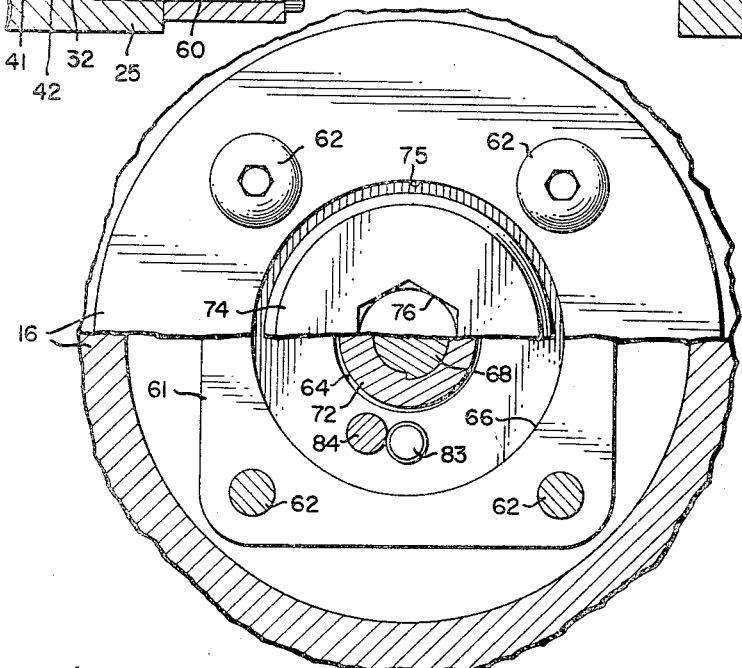
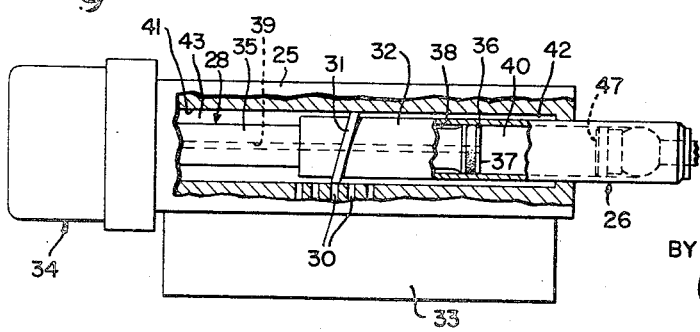
INVENTORS
John S. Ballard
Kenneth D. Garnjost
Robert Z. Hague
William C. Moog
Conrad C. Treff
BY  *Popp and Sommer*
ATTORNEYS

United States Patent Office 3,405,600
Patented Oct. 15, 1968

1

3,405,600
NUMERICAL CONTROL POSITIONING
APPARATUS
John S. Ballard, East Aurora, and Kenneth D. Garnjost, Buffalo, N.Y., Robert Z. Hague, Oradell, N.J., William C. Moog, Jr., East Aurora, N.Y., and Conrad C. Treff, Ramsey, N.J., assignors to Moog Inc., East Aurora, N.Y., a corporation of New York
Filed Feb. 9, 1966, Ser. No. 526,270
11 Claims. (Cl. 90—21.5)

ABSTRACT OF THE DISCLOSURE

A machine tool has two numerical control positioning means for moving saddle and table members severally along different axes, each such means including a cylinder which is fixedly mounted on the saddle member and a piston rod the exposed end of which has a lost motion connection to the machine tool bed in the case of one positioning means and to the table member in the case of the other positioning means, preferably at least one of such connections including zero adjustment mechanism.

---

This invention relates to numerical control positioning apparatus, and more particularly to such apparatus associated with a machine tool such as a milling machine.

As is known a machine tool such as a milling machine has a bed or knee on which a saddle is slidably arranged for movement along one axis and a table is slidably arranged on said saddle for movement along a second axis, and the workpiece is suitably supported on said table. It is also known, as disclosed in United States Patents Nos. 3,174,406 and 3,198,084, to move the saddle and table along their respective axes by numerical control positioning apparatus comprising independent hydraulic means for the saddle and table.

The primary object of the present invention is to provide in a machine tool numerical control positioning apparatus which positions the members associated therewith such as the saddle and table in a repeatably highly accurate manner.

Another object is to provide such apparatus in which the accuracy thereof as a positioner is determined by a minimum of relatively movable elements.

Another object is to provide such apparatus which permits very accurate set up of the workpiece on the machine tool and which set up can be effected easily and quickly.

A further object is to provide such apparatus which has a simple, orderly and compact arrangement of its components.

Still other objects and advantages of the present invention will be apparent from the following detailed description of a preferred embodiment illustrated in the accompanying drawings wherein:

FIG. 2 is a vertical sectional view thereof taken generally on line 2—2 of FIG. 1.

FIG. 3 is a greatly enlarged fragmentary sectional view thereof taken on line 3—3 of FIG. 1.

FIG. 4 is a partial elevational and sectional view thereof taken on line 4—4 of FIG. 3.

FIG. 5 is a somewhat schematic longitudinal view of one of the piston and cylinder means shown in the other figures and having portions broken away to reveal hidden structure.

2

Figure 1:
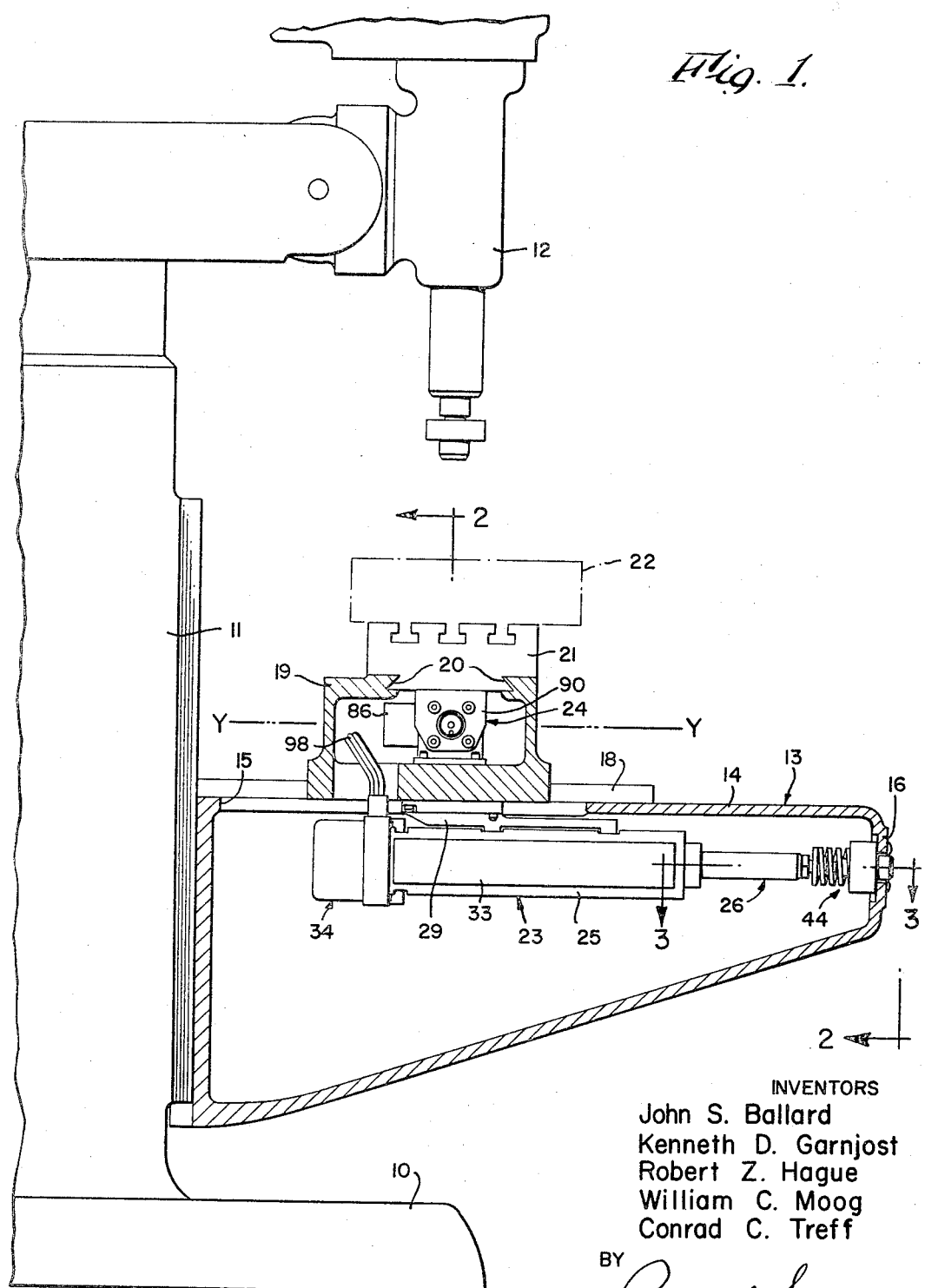
FIG. 1 is a fragmentary side elevational view of a machine tool of the milling machine type equipped with numerical control positioning apparatus constructed in accordance with the principles of the present invention, certain parts being shown in section.

The milling machine with which the present invention is associated is shown as having a base 10, a pedestal or column 11, a spindle head 12 and a bed or knee member 13. This knee is shown as projecting outwardly from the pedestal 11 and as being of hollow construction, having a horizontal top wall 14 provided with an elongated opening 15 therein and also having a front or outer vertical wall 16. Top wall 14 has suitable ways 18 supporting a saddle 19 for sliding movement thereon along a horizontal axis which may be regarded as the Y—Y axis. Saddle 19 is shown as being of general channel shape and having dovetail ways 20 supporting a table member 21 for sliding movement thereon along a horizontal axis which may be regarded as the X—X axis. The two axes are perpendicular to each other.

Table 21 is adapted to have fastened thereto in any suitable manner a fixture 22, shown only in FIG. 1, for holding a workpiece (not shown).

Numerical control apparatus is shown as comprising first positioning means 23 operatively interposed between saddle 19 and bed 13 and second positioning means 24 operatively interposed between saddle 19 and table 21.

Positioning means 23 is shown as arranged within hollow knee or bed member 13 and comprising a cylinder body member 25 with which a micro piston assembly 26 and also a secondary piston assembly 28 are operatively associated. Cylinder body member 25 is rigidly connected in suitable manner to the bottom of saddle 19 by a shoe-shaped bracket 29 which extends through opening 15.

The cylinder wall of member 25 is provided with a series of gage point ports spaced at uniform longitudinally spaced intervals therealong, several of which are shown representatively at 30 in FIG. 5. Operatively associated with such ports 30 is a helical valving land 31 carried on a tubular piston rod 32, this land and rod forming part of micro piston assembly 26. Also operatively associated with such ports is a linear selector valve means 33 which is shown as fixedly mounted on one side of cylinder body member 25. A rotary selector valve means 34 including a rotary actuator is operatively associated with a piston rod 35 of a secondary piston assembly 28 and is shown as mounted on that end of cylinder body member 25 adjacent machine pedestal 11.

Referring to FIG. 5, piston rod 35 is shown as having a piston head 36 on its end remote from rotary selector valve means 34 and this head is slidably and sealingly arranged in bore 38 of tubular piston rod 32. Piston rod 35 also has a passage 39 extending longitudinally thereof and leading to the outer end face 37 of piston head 36 defining one end of an actuator chamber 40.

Micro piston rod 32 is rotatably and slidably arranged in bore 41 of cylinder body member 25. Secondary piston rod 35 is rotatable but constrained against longitudinal movement relative to cylinder body member 25. Both piston rods 32 and 35 have suitable means such as a pin and slot connection (not shown) which allows relative longitudinal movement but prevents any relative rotative movement between them.

Chamber 42 to the right of valving land 31, as viewed in FIG. 5, is suitably connected to a source of pressurized fluid, and chamber 43 to the left of this land is connected to fluid return. Actuator chamber 40 is connected via passage 39 to one of the ports 30 through linear selector valve means 33.

The ports 30 are closed save one at any given time. The opening of a given one of such ports is controlled by selective operation of linear valve means 33. For example, if a port to the left of valving land 31 is opened actuator chamber 40 is placed in communication with return and the pressure in chamber 42 against the right hand end face of land 31 will drive piston rod 32 to the left until this land positions itself over or nulls on the selected port.

Valving land 31 is in the form of a helix having a lead corresponding to the center to center spacing between two adjacent ports 30. Selective operation of rotary valve means 34 will rotate piston rod 35 and hence piston rod 32 with its valving land 31 thereon through the desired angle so as to position piston rod 32 that increment desired of a coarse spacing between adjacent ports 30.

For a more detailed illustration of the construction and operation of such a positioner, cross reference is made to the disclosures of said Patents Nos. 3,174,406 and 3,198,084.

In said patents the equivalent of piston rod 32 was shown as connected by an antifriction bearing to the saddle or table. In accordance with the present invention piston rod 32 which is rotatable as well as being longitudinally movable is shown as having a nonrotative extension which is operatively associated with a zero adjust mechanism represented generally by the numeral 44. The construction of this extension and mechanism is best shown in FIG. 3 and will now be described.

The outer end of tubular piston rod 32 is shown in FIG. 3 as being closed by a cylindrical load plug element 45 having an annular groove in which an annular seal ring 46 such as a rubber O-ring is arranged. This ring 46 slidably and sealingly engages bore 38 of piston rod 32. One end face 47 of this load plug element 45 opposes end face 37 of piston head 36 and defines an end wall for actuator chamber 40. The outer end face of load plug element 45 has a concave surface 48 specifically shown as a conical surface which engages the spherical surface of a ball head 49 on one end of a rod extension element 50.

Surrounding rod extension element 50 is a tubular ball seat element 51. The inner end of this element 51 has a concave surface 52 specifically shown as a partial spherical surface which engages the spherical surface of ball head 49 on the side of this head opposite from that on which load plug element 45 is arranged. Ball seat element 51 has a threaded engagement with piston rod 32 as indicated at 53. A slight annular clearance as indicated at 54 exists between the opposing peripheral surfaces of rod extension element 50 and ball seat element 51 for a purpose explained later herein.

The end of cylinder body member 25 is shown in FIG. 3 as closed by an end cap 55 which surrounds piston rod 32 and sealingly and slidably engages the same by an annular seal assembly 56 including a plastic boot backed up by a rubber O-ring arranged in a groove provided in the end cap. An annular wiper 58 arranged in a groove provided in end cap 55 outwardly of seal assembly 56 engages the peripheral surface of piston rod 32 and serves to wipe this surface as this piston rod moves inwardly of cylinder member 25. An annular seal assembly 59 is interposed between end cap 55 and cylinder member 25. While any suitable means may be employed for fastening end cap 55 to this cylinder member 25 a plurality of circumferentially disposed cap screws 60 are used for this purpose.

The zero adjust mechanism 44 is shown as comprising a bracket or element 61 arranged on the inside of front knee wall 16 and rigidly secured thereto in any suitable manner as by a plurality of cap screws 62, four such screws being shown in FIGS. 2 and 4. Element 61 is also shown as having a through-bore including stepped bore sections 63 and 64 to provide an annular radial flat shoulder 65 therebetween which faces axially outwardly away from cylinder body member 25. Bore section 63 is arranged adjacent ball head 49 and bore section 64 is remote from this head. The outer end of bore section 64 is counterbored as indicated at 66.

Rod extension element 50 has an axially projecting cylindrical shank portion 68 of somewhat smaller diameter to provide an axially outwardly facing annular shoulder 69 adjacent ball head 49. The outer end portion of shank 68 has an external screw head 70 which is threadedly received in the internal screw thread 71 formed on a nut member 72. This nut member 72 has a cylindrical periphery surrounded with some radial clearance by the wall of bore section 64, also has a flat end face 73 at its inner end which abuttingly engages shoulder 65, further has an enlarged cylindrical head portion 74 at its outer end arranged in a cylindrical opening 75 in knee wall 16, this opening being shown as an extension of counterbore 66, and still further has a central out-of-round recess 76 at the outer end of the internally threaded portion 71 to receive a suitable tool such as an Allen wrench for turning the nut for a purpose explained later herein.

Abutting surfaces 65 and 73 are urged into forceful engagement at all times by a preloaded helical compression spring 78 surrounding rod extension element shank 68. One end of this spring 78 bears against a shoulder 79 on element 61, the other end bearing against a retainer ring 80 which surrounds shank 68 and abuttingly engages shoulder 69.

Rod extension element 50 is constrained against rotative movement relative to element 61. For this purpose, this element 61 has a longitudinal slot 81 into which one end portion of a pin 82 carried by shank 68 is arranged.

By turning nut 72, while surfaces 65 and 73 are maintained in engagement by spring 78, the rod extension element 50 can be caused to move axially relative to element 61. The amount of this relative movement is limited so that the loading on spring 78 is maintained at all times. For this purpose, the shoulder between bore section 64 and counterbore 66 has an axial recess in which a dowel pin 83 is partially arranged so that this pin projects into the space of this counterbore. At about the same radius from the horizontal axis of rotation of nut 72, this nut has a threaded horizontal hole in which a screw 84 is arranged with its inner end projecting into the space of counterbore 66. The stop pin 83 and screw 84 overlap so that one will strike the other when nut 72 is attempted to be turned relative to element 61 beyond a predetermined amount. As best shown in FIG. 4, the amount of such angular movement is limited to about one revolution.

Referring to FIG. 2, positioning means 24 for table 21 is similar in construction to positioning means 23 for saddle 19 just described and hence a detailed description will not be repeated. Suffice it to point out that positioning means 24 has a cylinder body member 85, a linear selector valve means 86 arranged on one side thereof, a micro piston assembly 88 projecting from one end thereof and connected by a zero adjust mechanism 89 to a bracket or element 90, and a rotary selector valve means 91 including a rotary actuator mounted on the opposite end of member 85.

Cylinder body member 85 is rigidly secured to saddle 19 in any suitable manner. As shown, a bracket 92 screwed both to member 85 and saddle 19 secures one end of this member, and a tongue and groove interlock indicated at 94 secures the other end of this member to the saddle. Bracket or element 90 is shown secured as by screws 95 to the bottom of table member 21 at the end thereof remote from rotary selector valve means 91.

As is apparent from a reading of said Patents 3,174,406 and 3,198,084 the linear and rotary selector valve means 33, 34, 86 and 91, respectively, are controlled pneumatically through transducers although handling a liquid such as oil. To service these means, a fluid handling manifold block 96 is shown as suitably mounted on the bottom of saddle 19 to one side of knee 13. Hard conduits 98 (FIG. 1) extend between block 96 and positioning means 23 and other hard conduits 99 (FIG. 2) extend between this block and positioning means 24.

As shown in FIG. 2, a flexible trunk 100 of service fluid handling conduits extends from manifold block 96 to a junction box 101 mounted on one side of machine pedestal 11, this trunk containing pneumatic and hydraulic conduits or lines. Junction box 101 is shown as receiving a second flexible trunk 102 leading from a hydraulic power source (not shown), this trunk containing pressure and return hydraulic conduits or lines. Junction box 101 is also shown as receiving a third flexible trunk 103 leading from a control console (not shown), this trunk containing pneumatic conduits or lines. Trunk 100 contains extensions of the hydraulic and pneumatic conduits or lines contained in trunks 102 and 103. This provides a very tidy arrangement.

An important feature of the present invention is that the cylinder body members 25 and 85 of the positioning means 23 and 24 for both axes are fixed to saddle 19. This fixes the reference ports 30 relative to saddle 19. Position of the table 21 relative to the spindle head 12 is determined by the angular position of the valving land 31 on each of the micro piston assemblies 26 and 88. These valving lands 31 then move until they null on the preselected gage point port 30.

The piston rod extension element 50 for each axis with its ball head 49 and associated ball seat element 51 and load plug element 45 allows relative rotative movement between the tubular piston rod 32 and the corresponding element 50 while the corresponding rotary selector valve means 34 or 91 and its actuator rotates the corresponding valving land 31 the preselected amount. During this rotation the pressure in actuator chamber 40 is relieved thus taking a clamping hydraulic load off load plug element 45. However, after the preselected rotation has been effected pressurized fluid is admitted either to chamber 42 or chamber 40 depending upon whether a port 30 is opened by its linear selector valve means 33 or 86 to the right or left of the valving land 31.

If a port 30 is opened to the right of the valving land 31, as viewed in FIG. 5 pressurized fluid is admitted to actuator chamber 40 forcing load plug element 45 firmly against ball head 49 which in turn is firmly forced against ball seat element 51. In other words, ball head 49 is firmly clamped between elements 45 and 51 when the fluid in actuator chamber 40 is pressurized. Inasmuch as the area of end face 47 is twice that of the end face of valving land 31, piston head 36 and load plug element 45 will be driven apart and cylinder body element 25 will be driven to the left as viewed in FIGS. 1 and 5.

On the other hand, if a port 30 is opened to the left of valving land 31, as viewed in FIG. 5, actuator chamber 40 is connected to fluid return and pressurized fluid in chamber 42 causes movement of cylinder body element 25 to the right relative to piston rod 32. This in effect pushes ball seat element 51 firmly against ball head 49.

In either case, it will be seen that piston rod extension element 50 for each positioning means 23 and 24 allows relative rotation between the corresponding valving land 31 and cylinder 25 or 85 while the corresponding rotary selector valve means 34 or 91 is operative but once the desired angular adjustment of the valving land has been made and the corresponding micro piston assembly 26 or 88 moves relative to its respective cylinder 25 or 85 all slack is eliminated between ball head 49 and its seat element 51.

Thus a minimum number of parts are involved in the accuracy of positioning performance of the means 23 and 24. Specifically all that is involved is the appropriate port 30 being opened and the appropriate rotation of the corresponding valving land 31. No lost motion and hence error can occur in the ball joint connection provided by piston rod extension element 50 since final position is determined when this joint is loaded, as just observed. No lost motion can occur between abutting faces 65 and 73 in the zero adjust mechanism 44 or 89 because of the preloaded condition of spring 78. No lost motion can occur between the cylinder body members 25 and 85 relative to the machine bed because both of these members are fixed to the saddle which has its path of movement confined by ways 18, and, of course, the gage point ports 30 in each of these members have a prefixed orientation relative to the saddle.

With the foregoing simple arrangement extemely high and repeatable positioning accuracy can be achieved involving a minimum of parts which can cause error.

Each of the zero adjust mechanisms 44 and 89 allows limited adjustment in the position of the fixture 22 holding the workpiece along each of the axes X—X and Y—Y. Typically the range of adjustment is about 0.040 inch, determined by the lead of screw threads 70 and 71. Referring to FIG. 3, it will be seen that by rotating nut 72 relative to shank 68, within the limits of about one revolution permitted by screw 84 in a path of interference with stop pin 83, the ball head 49 on piston rod extension element 50 can be caused to be moved toward or away from bracket or element 61 and hence end wall 16 depending upon the direction in which this nut is turned. The loading on spring 78 takes up all slack in threads 70 and 71 and serves to maintain the adjustment of nut 72 made, as well as to maintain abutting surfaces 65 and 73 in firm engagement. In this manner the effective length of piston rod 32 can be varied, as can also the similar piston rod in positioning means 24 for axis X—X.

The radial clearance 54 between rod extension element 50 and ball seat element 51 allows for some misalignment between the axis of rod element 50 when connected to its bracket or element 61 or 90 and the axis of its tubular piston rod 32 or 85, such misalignment being accommodated by ball head 49 cocking slightly on seat element 51.

From the foregoing it will be seen that the embodiment illustrated and described achieves the objects stated. Inasmuch as changes and modifications may occur to those skilled in the art, this embodiment is illustrative and not limitative of the invention the scope of which is to be measured by the appended claims.

What is claimed is:

1. A machine tool having a bed, a saddle slidably arranged on said bed for movement along one axis, a table slidably arranged on said saddle for movement along a second axis, first numerical control positioning means operatively interposed between said saddle and bed and including a first cylinder having axially spaced first gage ports, a first helical valving land slidably and rotatably arranged in said first cylinder and cooperable with said first ports, a first rotatable and slidable piston rod carrying said first land and extending from said first cylinder, first linear selector valve means operatively associated with said first cylinder for opening a selected one of said first ports and first rotary selector valve means operatively associated with said first piston rod and land for rotating the same a selected amount, and second numerical control positioning means operatively interposed between said saddle and table and including a second cylinder having axially spaced second gage ports, a second helical valving land slidably and rotatably arranged in said second cylinder and cooperable with said second ports, a second rotatable and slidable piston rod carrying said second land and extending from said second cylinder, second linear selector valve means operatively associated with said second cylinder for opening a selected one of said second ports, and second rotary selector valve means operatively associated with said second piston rod and land for rotating the same a selected amount, wherein the improvement comprises means fixedly mounting each of said cylinders on said saddle, first connection means connecting said first piston rod to said bed and arranged to eliminate lost motion therebetween, and second connection means connecting said second piston rod to said table and arranged to eliminate lost motion therebetween.

2. A machine tool as set forth in claim 1 wherein a fluid handling manifold block is mounted on said saddle and has fluid conducting communication with both said positioning means, and a flexible trunk of service fluid handling conduits from a source external of said saddle is operatively connected to said block.

3. A machine tool as set forth in claim 2 wherein said trunk is connected to a junction box mounted on the machine, and additional flexible trunks of supply fluid handling conduits are connected to said junction box and operatively associated with the first mentioned trunk.

4. A machine tool as set forth in claim 1 wherein at least one of said connection means includes a zero adjust mechanism.

5. A machine tool including a bed member, a saddle slidably arranged on said bed member for movement along one axis and a table member slidably arranged on said saddle for movement along a second axis, and positioning means operatively interposed between said saddle and each of said members and each including a cylinder from which a piston rod extends, wherein the improvement which comprises means fixedly mounting each of said cylinders on said saddle, means connecting each of said piston rods to the corresponding one of said members, at least one of such connecting means including a zero adjust mechanism which comprises an element secured to said one of said members and having a through-bore including stepped bore sections to provide an axially facing shoulder therebetween, the corresponding one of said piston rods being nonrotatably slidable in one of said sections and having external threads, a nut threadedly mounted on said external threads and having an end face opposing said shoulder, and spring means operatively interposed between said one of said piston rods and element to urge said shoulder and end face into abutting engagement.

6. A machine tool as set forth in claim 5 wherein the axial position of said piston rod relative to said element can be changed by rotation of said nut relative to said piston rod, and means limiting rotation of said nut relative to said piston rod.

7. A machine tool as set forth in claim 6 wherein said limiting means includes a first pin projecting from said one of said members and a second pin projecting from said nut and arranged in a path of interference with said first pin whereby the extent of relative rotation permitted between said one of said members and nut approaches one full revolution.

8. In a machine tool a bed member, a saddle slidably arranged on said bed member for movement along one axis and a table member slidably arranged on said saddle for movement along a second axis, the combination therewith of positioning means operatively interposed between said saddle and each of said members and each including a cylinder fixed to said saddle, a micro piston assembly inclunding a rotatable and slidable tubular piston rod, a secondary piston assembly including a piston head slidably arranged in said piston rod, and means providing a nonrotatable extension for said piston rod including a rod extension element, a ball head on one end of said rod extension element, means fastening the other end of said rod extension element to the corresopnding one of said members, a ball seat element on one side of said ball head and fastened to said piston rod and a load plug element on the other side of said ball head and arranged to engage the same, the space between said load plug element and said piston head providing an actuating chamber with respect to which fluid can be flowed for effecting movement of said piston rod relative to said cylinder.

9. The combination as set forth in claim 8 wherein said ball head has a convex spherical surface, said ball seat element has a first concave surface providing a first seat for said ball head, and said load plug element has a second concave surface providing a second seat for said ball head.

10. The combination as set forth in claim 9 wherein said plug element sealingly engages the internal surface of said piston rod so that fluid when pressurized above a predetermined limit in said chamber clamps said concave surfaces against said convex surface but when pressurized below said limit permits relative rotation between said ball seat element and ball head.

11. The combination as set forth in claim 10 wherein said ball seat element is annular and surrounds said rod extension element, there being some radial clearance between the opposing surfaces of such elements, and end cap means are provided for sealingly closing that end of said cylinder through which said piston rod extends, said means including an annular cap element sealingly fastened to said cylinder and surrounding said piston rod, and annular seal means carried by said annular cap element and sealingly engaging the opposing surface of said piston rod.

References Cited
UNITED STATES PATENTS

| | | | |
|---|---|---|---|
| 3,174,406 | 3/1965 | Hague et al. | 91—19 |
| 3,198,084 | 8/1965 | Hague et al. | 91—37 |
| 3,242,772 | 3/1966 | Grimland et al. | 77—32.2 |

FRANCIS S. HUSAR, *Primary Examiner.*